No. 863,768. PATENTED AUG. 20, 1907.
G. WEICKHARDT.
UNIVERSAL WIND CHEST FOR PIPE ORGANS.
APPLICATION FILED JAN. 25, 1907.

3 SHEETS—SHEET 1.

Witnesses.

Inventor,
George Weickhardt.
By Benedict, Morsell & Caldwell.
Attorneys.

No. 863,768. PATENTED AUG. 20, 1907.
G. WEICKHARDT.
UNIVERSAL WIND CHEST FOR PIPE ORGANS.
APPLICATION FILED JAN. 25, 1907.

3 SHEETS—SHEET 2.

Witnesses.
Inventor.
George Weickhardt,
By Benedict, Morsell & Caldwell.
Attorneys.

No. 863,768. PATENTED AUG. 20, 1907.
G. WEICKHARDT.
UNIVERSAL WIND CHEST FOR PIPE ORGANS.
APPLICATION FILED JAN. 25, 1907.
3 SHEETS—SHEET 3.
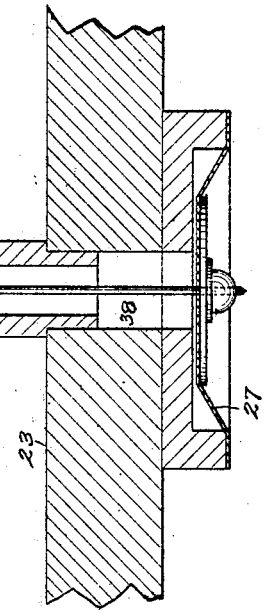
Witnesses.
Inventor.
George Weickhardt,
By Benedict, Morsell & Caldwell.
Attorneys.

UNITED STATES PATENT OFFICE.

GEORGE WEICKHARDT, OF MILWAUKEE, WISCONSIN.

UNIVERSAL WIND-CHEST FOR PIPE-ORGANS.

No. 863,768.   Specification of Letters Patent.   Patented Aug. 20, 1907.

Application filed January 25, 1907. Serial No. 354,040.

To all whom it may concern:

Be it known that I, GEORGE WEICKHARDT, residing in Milwaukee, in the county of Milwaukee and State of Wisconsin, have invented new and useful Improvements in Universal Wind-Chests for Pipe-Organs, of which the following is a description, reference being had to the accompanying drawings, which are a part of this specification.

This invention has for its object to provide an improved universal wind chest for pipe organs having pneumatic pipe-valves of novel construction, which will be simple in construction, effective in operation, and readily accessible.

Another object of the invention is to provide a pneumatic pipe-valve for universal wind chests comprising a valve stem which is mounted so as to have a single fixed bearing, its one end carrying a disk valve for closing the pipe duct and its other end being connected with a leather or membrane pneumatic for actuating it.

Another object of this invention is to provide adjustable guards for disk pipe-valves of an organ, which will prevent the valves leaving their seats farther than is necessary for the proper supply of air to the pipes in order that they may more quickly respond to the closing impulse.

Another object of this invention is to improve upon general details of construction of a universal wind chest for organs.

With the above and other objects in view the invention consists in the universal wind chest for organs, its parts and combinations of parts as herein claimed and all equivalents.

Figure 1:
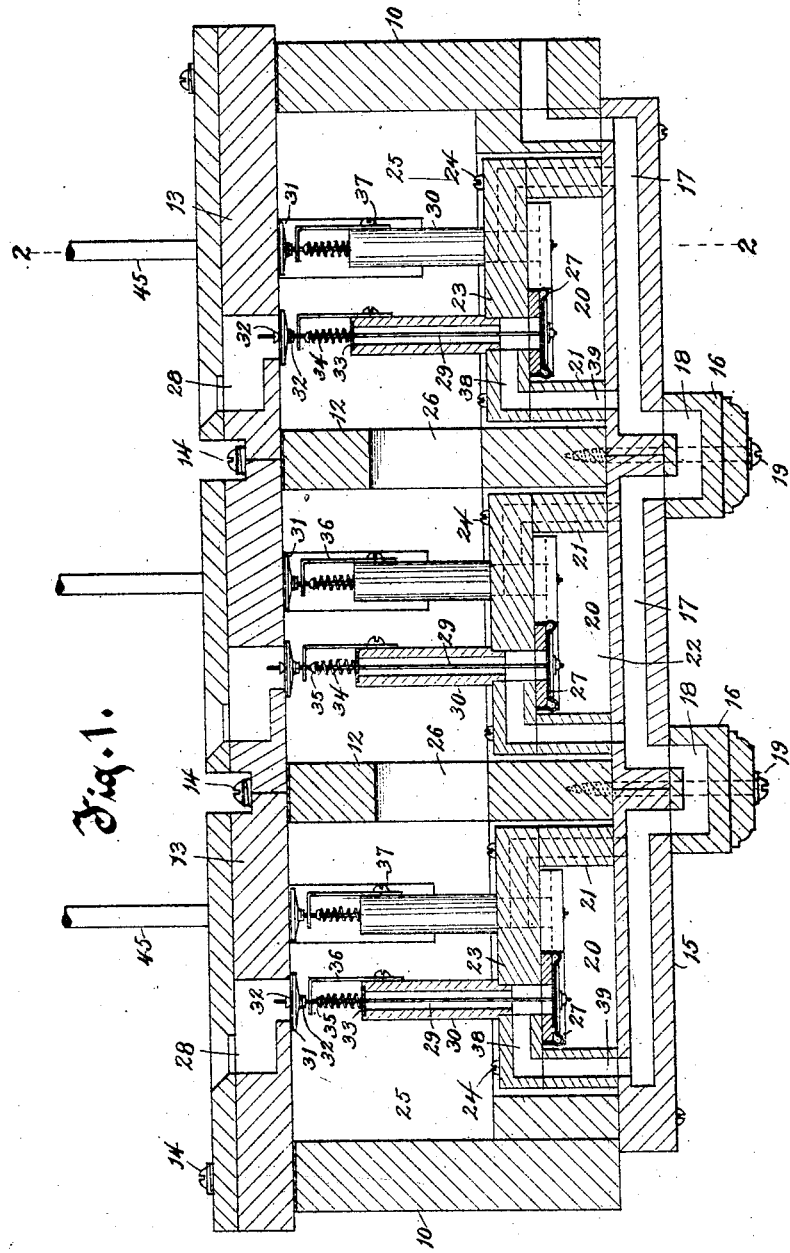
Figure 2:
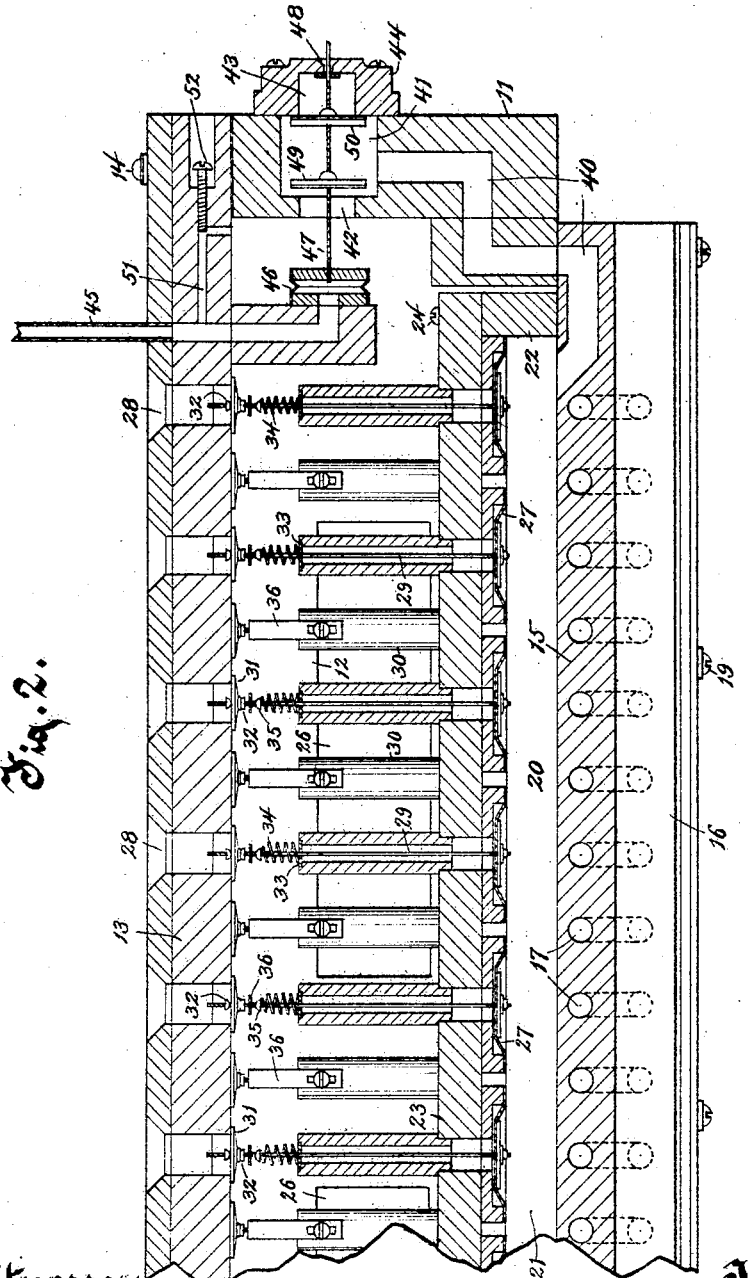

Referring to the accompanying drawings in which like characters of reference indicate the same parts in the several views:—Figure 1 is a transverse sectional view of a universal wind chest for organs constructed in accordance with this invention; Fig. 2 is a longitudinal sectional view through one stop section thereof on the line 2—2 of Fig. 1; Fig. 3 is a longitudinal sectional view of one of the pneumatic pipe-valves; Fig. 4 is a similar view taken on a plane at right angles to the sectional plane of Fig. 3; and, Fig. 5 is a bottom view of one of the adjustable guards for the disk pipe-valves.

In these drawings, 10 represents side pieces and 11 end pieces of a rectangular frame constituting the inclosure of the wind chest, there being open partitions 12 extending longitudinally through the interior thereof at intervals which mark the several separate stop sections of which the wind chest is composed. The wind chest is covered by a series of upper boards 13 extending lengthwise thereof and meeting each other upon the partitions 12, being secured to said partitions and to the frame by means of screws 14. Correspondingly, the bottom of the wind chest is closed by means of a series of channel boards 15, running lengthwise of the frame, which are also secured to the partitions 12 and the frame. Connecting bars 16 extend beneath the meeting edges of the channel boards to complete the sections of the channels 17 which extend through and across each channel board 15 and open on its bottom face near the edges, these connecting bars having similar channel sections 18 registering with the ends of the channel sections of the abutting channel boards, and the clamping screws 19 passing through the connecting bars and between the channel boards and into the partitions 12 to secure these parts together. Each channel board 15 forms the bottom of a stop duct 20 which is inclosed by side strips 21 and end strips 22 and occupies nearly the entire surface of the channel board within the wind chest. Top boards 23 cover the stop ducts and are fastened to the side strips 21 and end strips 22 by screws 24, so as to be removable therefrom for repair. The stop ducts 20 are tightly sealed by their inclosing walls and have no free communication with each other or with the universal chamber 25 thereabove, though the latter extends over all of them, communicating from section to section through the openings 26 in the partitions 12.

On the under side of each top board 23 and contained within the stop duct are mounted a series of pneumatics 27 which are staggered in their arrangement so as to lie directly beneath pipe ducts 28 formed in the upper board 13. Valve stems 29 are mounted on the movable disks of the pneumatics 27 and extend upwardly through openings in the top boards 23 and through guide tubes 30 fitting in said openings, with disk valves 31 loosely carried on their upper ends between leather nuts 32 and seated on the cover boards 13 to close the pipe ducts 28. The valve stems 29 are guided in their movements by passing through neatly fitting openings in guide disks 33 which are set in the upper ends of tubes 30, and coil springs 34 surround the valve stems and bear on the guide disks 33 at one end and on leather nuts 35 on the valve stems at the other end to lift the disk valves 31 and hold them against their seats. The guide disks 33 are preferably of leather fiber, which has been found in practice to be most suitable for the purpose, since it permits of a close fit with the valve stems allowing of their free movement without a material leakage of air therethrough.

Adjustable guards for limiting the degree of movement of the disk valves are provided, and comprise sheet metal strips 36 with their lower ends curved to fit the sides of the tubes 30 and adjustably held thereto by means of screws 37 passing through elongated slots of the strips and entering the tubes, the upper ends of the strips being bent over and forked to extend on opposite sides of the valve stems without touching them. When the disk valve 31 is opened by the operation of the pneumatic 27, the lower leather nut 32 engages the forked end of the guard strip 36 and prevents a further movement thereof, thus limiting the degree of opening of the disk valve to an extent which will allow the desired passage for the air to the pipe, but will prevent a greater opening in order that the valve may not have so far to move on closing and may therefore accomplish this action more promptly. The curvature of the guard strip 36 prevents its swinging upon the screw 37 so as to come into engagement with the valve stem.

The pneumatics 27 connect through passages 38 of the top boards 23 and passages 39 in the side strips 21 with the channels 17, of which there are as many as there are manual keys on the key board. Each channel 17 is connected with one of the pneumatic pipe-valves of each stop section as above described and is controlled by a manual key on the key board so that air under pressure is admitted thereto when the key is depressed and is exhausted therefrom when the key is released.

Each stop duct 20 connects by a passage 40 with a valve throat 41 in the end piece 11 which may communicate with the universal chamber through an opening 42 or with the external air through an outlet passage 43 in a guide strip 44. Each stop section is provided with a stop tube 45 which connects with a bellows or pneumatic 46 within the universal chamber, and a valve stem 47 carried by the movable board of such pneumatic is guided in its movements by passing through a guide opening 48 in the guide strip 44 and carries a disk valve 49 to close the opening 42 when the pneumatic is collapsed and a disk valve 50 to close the communication between the throat 41 and the external air when the pneumatic is inflated. A small feed duct 51 connects the passageway of pneumatic 46 with the universal chamber and an adjusting screw 52 controls the passage therethrough.

In operation, the universal chamber is kept constantly supplied with compressed air during the use of the organ, and when the draw stop with which a stop tube 45 connects is closed, this air pressure is conveyed by the feed duct 51 to the pneumatic 46, causing said pneumatic to become inflated and move the valve stem 47 outwardly so as to open valve 49 and close valve 50, permitting the compressed air of the universal chamber to pass by way of the passageway 40 to the stop duct 20, to maintain the pressure of the universal chamber in the stop duct.

When a stop is drawn, exhausting the air from the pneumatic 46 connected therewith, the pneumatic collapses by the pressure received by it from the compressed air in the universal chamber, closing valve 49 and opening valve 50. This change in position of valves 49 and 50 immediately exhausts the stop duct 20 connected therewith.

When a manual key is depressed so as to admit compressed air to its channel 17, this air will pass through passageways 39 and 38 of one of the pneumatic pipe-valves in each stop section and exert its pressure upon the upper surface of the membrane of the pneumatic 27 thereof, but owing to the pressure of air in the stop duct on the under side of the membrane which is equal to the air pressure above, the pneumatic is not affected and the disk valve controlled thereby is not disturbed. This is only true of such stop sections in which the stop duct is charged with compressed air as above described, for when the compressed air is admitted to a pneumatic 27 contained in a stop duct from which the compressed air has been exhausted, the said pneumatic becomes inflated, pulling the valve stem 29 against the action of spring 34 and removing the disk valve 31 from the pipe duct and causing the pipe which is planted on said pipe duct to speak. When the manual key is released and the pressure within the channel 17 is exhausted, the spring 34 and compressed air will quickly restore the pipe disk valve 31 to its seat without unnecessary loss of time, owing to the limitation to the opening thereof by the guard 36.

When the stop is again closed the flow of compressed air through duct 51 creates a pressure within the pneumatic 46 and returns valve 50 to its closed position and valve 49 to its open position, permitting the stop duct 20 to be again charged with compressed air which will prevent the opening of any of the pneumatic pipe-valves of that stop section. Thus the pipe-valves are restrained by air pressure against opening in response to the operation of the manual keys unless the stop duct of that section is exhausted, and the control of air to each stop duct is made by means of the draw stops.

Whenever repair or adjustment becomes necessary, any particular pipe-valve is quickly accessible by removing the connecting bar 16 on each side of the channel board 15 of the stop section in which that pipe valve is contained, thus freeing that particular channel board and permitting its removal with all of the pipe-valves thereon, without disturbing any of the other sections. Usually any repair or adjustment necessary may be accomplished without removing the top board 23 from the stop duct, but where access to the pnuematic 27 is desired this top board may be freely removed by loosening screws 24. When the adjustment or repair is accomplished the channel board 15 may be quickly and easily replaced, and when the connecting bars 16 are fastened in place the operation is complete, without disturbing other stop sections and without disturbing any of the pipes.

The valve stems 29, having only one stationary guide, are easily assembled by anyone of ordinary skill, as it is impossible for them to bind as would be done if two or more stationary bearings were provided. The tube 30 enables the stationary bearing to be placed as close to the disk valve 31 as possible, which is very desirable for steadying it in its operation. The leather-fiber guide-disk 33 forms an efficient guide-bearing for the valve-stem and closure for the space within the tube, which will effectively guide the valve stem in its free movements without permitting a material passage of air from the universal chamber to the interior of the tube. The disk valve 31 is free to pefectly seat itself over the bottom of the pipe-duct by giving in one direction or another as permitted by its mounting. The guard 36 by being adjusted close to the lower leather nut 32 when the disk valve 31 is closed will prevent the disk valve from moving far from its seat so as to require less time in closing when the manual key is released.

The simplicity of the construction and the accessibility of the parts facilitate adjustment and repair, and the general construction is such, that having once been properly set up and adjusted, the parts are not liable to become deranged and require repair.

What I claim as my invention is;

1. A universal wind chest for organs, comprising a universal chamber having pipe ducts, pipe-valves controlling communication between the universal chamber and its pipe ducts, pneumatics connected with the pipe-valves, independent stop ducts communicating with the pneumatics on one side of their moving parts and key controlled channels communicating with the pneumatics on the other side of their moving parts.

2. A universal valve chest for organs, comprising a universal chamber having pipe ducts, spring actuated pipe-valves controlling communication between the universal chamber and its pipe ducts, pneumatics connected with the pipe-valves, key controlled channels communicating with the interior of the pneumatics, and independent stop ducts within which the pneumatics are located.

3. A universal valve chest for organs, comprising a universal chamber having pipe ducts, spring actuated pipe-valves controlling communication between the universal chamber and its pipe ducts, pneumatics connected with the pipe-valves, independent stop ducts within which the pneumatics are located, stop controlled means for charging and exhausting the stop ducts, and key controlled channels communicating with the pneumatics.

4. A universal valve chest for organs, comprising a universal chamber having pipe ducts and formed by a series of stop sections, spring closed pipe-valves for each stop section controlling communication between the universal chamber and its pipe ducts, pneumatics connected with the pipe-valves, an independent stop duct for each stop section within which the pneumatics are located, stop controlled means for each stop section for connecting the stop duct of that stop section with the universal chamber or with the atmosphere, and key controlled channels communicating with the pneumatics.

5. A universal valve chest for organs, comprising a universal chamber having pipe ducts and formed by a series of stop sections, spring closed pipe-valves for each stop section controlling communication between the universal chamber and its pipe ducts, pneumatics connected with the pipe-valves, an independent stop duct for each stop section within which the pneumatics are located, a pneumatic for each stop section located within the universal chamber and having means for connecting it with a draw stop of the organ, a double disk valve connected with said pneumatic and controlling a passageway leading to the stop duct of that stop section and adapted to connect said passageway with the universal chamber in one position and with the atmosphere in another position, and key controlled channels communicating with the pneumatics.

6. A universal valve chest for organs, comprising a universal chamber having pipe ducts and formed by a series of stop sections, spring closed pipe valves for each stop section controlling communication between the universal chamber and its pipe ducts, pneumatics connected with the pipe-valves, an independent stop duct for each stop section within which the pneumatics are located, a pneumatic for each stop section located within the universal chamber and having means for connecting it with a draw stop of the organ, there being an adjustably controlled passageway leading from the universal chamber to the interior of said pneumatic, a valve stem connected with said pneumatic, a pair of disk valves carried by the valve stem for alternately closing ports leading from a passageway of the stop duct to the universal chamber and to the atmosphere, and key controlled channels communicating with the pneumatics of the pipe-valves.

7. A pipe-valve for wind chests of organs, comprising a tube, a pneumatic at one end of the tube, a valve stem connected with the pneumatic and passing through the tube, a guide disk at the other end of the tube through which the valve stem passes permitting movements of the valve stem without a material passage of air therethrough, and a disk valve carried by the valve stem.

8. A pipe-valve for wind chests of organs, comprising a tube, a pneumatic at one end of the tube, a valve stem connected with the pneumatic and passing through the tube, a leather fiber guide disk set into the other end of the tube and having an opening through which the valve stem passes permitting movements of the valve stem without a material passage of air therethrough, and a disk valve carried by the valve stem and adapted to be moved into and out of engagement with a pipe duct.

9. A pipe-valve for wind chests of organs, comprising a tube, a pneumatic at one end of the tube, a valve stem connected with the pneumatic and passing through the tube, a guide disk at the other end of the tube permitting movements of the valve stem without a material passage of air therethrough, a disk valve carried by the valve stem and adapted to be moved into and out of engagement with a pipe duct, a spring seated on the guide disk and surrounding the valve stem, and a nut on the valve stem engaging the spring.

10. A pipe valve for wind chests of organs, comprising a tube, a pneumatic at one end of the tube, a valve stem connected with the pneumatic and passing through the tube, a guide disk at the other end of the tube permitting the movements of the valve stem without a material passage of air therethrough, a disk valve carried by the valve stem and adapted to be moved into and out of engagement with a pipe duct, a spring seated on the guide disk and surrounding the valve stem, a nut on the valve stem engaging the spring, and a guard adjustably mounted on the tube and standing in the path of the disk valve for limiting the movement of the disk valve from its seat.

11. A pipe valve for wind chests of organs, comprising a tube, a pneumatic at one end of the tube, a valve stem connected with the pneumatic and passing through the tube, a guide disk at the other end of the tube permitting movements of the valve stem without a material passage of air therethrough, a disk valve carried by the valve stem and adapted to be moved into and out of engagement with a pipe duct, a spring seated on the guide disk and surrounding the valve stem, a nut on the valve stem engaging the spring, and a guard comprising a strip of metal adjustably secured to the tube with its end bent at an angle and forked to pass on opposite sides of the valve stem and standing in the path of the valve to limit the valve in its movements away from its seat.

12. A pipe valve for wind chests of organs, comprising a tube, a pneumatic at one end of the tube, a valve stem connected with the pneumatic and passing through the tube, a guide disk at the other end of the tube permitting movements of the valve stem without a material passage of air therethrough, a disk valve carried by the valve stem and adapted to be moved into and out of engagement with a pipe duct, a spring seated on the guide disk and surrounding the valve stem, a nut on the valve stem engaging the spring, and a guard comprising a strip of metal curved to fit the tube and adjustably mounted thereon by having a screw passing through a slot thereof and entering the tube, the upper end of the strip being bent at an angle and forked to extend on opposite sides of the valve stem and stand in the path of the valve to limit the movements of the valve away from its seat.

13. A wind chest for pipe organs, comprising a frame, open partitions extending through the frame, a cover for the frame having pipe ducts, and channel boards for closing the bottom of the frame with their meeting edges secured to the partitions and their channel sections communicating with each other, each channel board having an independent stop duct with pipe valves controlled thereby and communicating with the channel sections.

14. A wind chest for pipe organs, comprising a frame, open partitions extending through the frame, a cover for the frame having pipe ducts, channel boards for closing the bottom of the frame with their meeting edges located at the partitions, connecting bars extending along the meeting edges of the bottom boards and having channel sections connecting the channel sections of abutting channel boards, and securing means passing through the connecting bars and into the partitions for securing the parts together, each channel board having an independent stop duct with pipe valves controlled thereby and communicating with the channel sections.

In testimony whereof, I affix my signature, in presence of two witnesses.

GEORGE WEICKHARDT.

Witnesses:
R. S. C. CALDWELL,
ANNA F. SCHMIDTBAUER.